(12) United States Patent
Zhang et al.

(10) Patent No.: US 11,372,284 B2
(45) Date of Patent: Jun. 28, 2022

(54) BACKLIGHT MODULE, DISPLAY MODULE AND CONTROL METHOD THEREFOR, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Shubai Zhang, Beijing (CN); Guangquan Wang, Beijing (CN); Haiwei Sun, Beijing (CN); Jian Sang, Beijing (CN); Xuerong Wang, Beijing (CN); Zhiyang Cui, Beijing (CN); Junjie Ma, Beijing (CN); Zhonghua Li, Beijing (CN); Zhen Wang, Beijing (CN); Junjie Xie, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 843 days.

(21) Appl. No.: 16/077,089

(22) PCT Filed: Feb. 9, 2018

(86) PCT No.: PCT/CN2018/076078
§ 371 (c)(1),
(2) Date: Aug. 10, 2018

(87) PCT Pub. No.: WO2019/007067
PCT Pub. Date: Jan. 10, 2019

(65) Prior Publication Data
US 2021/0200033 A1    Jul. 1, 2021

(30) Foreign Application Priority Data
Jul. 4, 2017 (CN) .......................... 201710537929.1

(51) Int. Cl.
*G02F 1/13357* (2006.01)
*G02F 1/1335* (2006.01)

(52) U.S. Cl.
CPC .. *G02F 1/133608* (2013.01); *G02F 1/133607* (2021.01); *G02F 1/133612* (2021.01)

(58) Field of Classification Search
CPC ................................. G02F 1/133607–133615
(Continued)

(56) References Cited

U.S. PATENT DOCUMENTS

| 5,633,629 A * | 5/1997 | Hochstein | G08G 1/095 340/907 |
| 6,517,213 B1 * | 2/2003 | Fujita | G09F 13/04 362/23.18 |

(Continued)

FOREIGN PATENT DOCUMENTS

| CN | 101097345 A | 1/2008 |
| CN | 102313203 A | 1/2012 |

(Continued)

OTHER PUBLICATIONS

International Search Report dated Apr. 28, 2018 in PCT/CN2018/076078.

*Primary Examiner* — Jason M Han
(74) *Attorney, Agent, or Firm* — Fay Sharpe LLP

(57) ABSTRACT

A backlight module (0), a display module (1) and control method thereof, and a storage medium, in the field of display technology. The backlight module (0) includes m backlight components (01), wherein m is larger than or equal to 2 and is an integer, the m backlight components (01) are capable of emitting light alternately, and the light rays emitted by any two of the m backlight components (01) do not overlap. The present disclosure solves the problem that the backlight module (0) has lower working stability. The working sta- (Continued)

bility of the backlight module (0) is favorably improved. The backlight module (0) is used for the display module (1).

20 Claims, 7 Drawing Sheets

(58) Field of Classification Search
USPC .................................................. 362/612, 616
See application file for complete search history.

(56) References Cited

U.S. PATENT DOCUMENTS

| | | | |
|---|---|---|---|
| 9,488,337 B2 * | 11/2016 | Park | ..................... G02B 6/0078 |
| 2005/0254258 A1 | 11/2005 | Lee | |
| 2007/0070625 A1 | 3/2007 | Bang | |

FOREIGN PATENT DOCUMENTS

| CN | 102933893 A | 2/2013 |
|---|---|---|
| CN | 1697999 A | 11/2015 |
| CN | 107092139 A | 8/2017 |

\* cited by examiner

BACKLIGHT MODULE, DISPLAY MODULE AND CONTROL METHOD THEREFOR, AND STORAGE MEDIUM

This application is a 371 of PCT Patent Application Serial No. PCT/CN2018/076078, filed on Feb. 9, 2018, which claims priority to Chinese Patent Application No. 201710537929.1, filed with the State Intellectual Property Office on Jul. 4, 2017 and titled "BACKLIGHT MODULE, DISPLAY MODULE AND CONTROL METHOD THEREFOR, AND STORAGE MEDIUM", the entire contents of which are incorporated herein by reference.

TECHNICAL FIELD

The present disclosure relates to, but is not limited to a backlight module, a display module and control method thereof, and a storage medium.

BACKGROUND

Display modules are common modules in the field of display. With the application of augmented reality (AR) display devices and virtual reality (VR) display devices, the requirements on the performances of the display modules are also higher and higher. At present, the display modules of the AR&VR display devices mainly comprise liquid crystal display (LCD) display modules and organic light-emitting diode (OLED) display modules. The LCD display modules have the advantages of low cost, low power consumption and the like and thus are applied broadly.

The LCD display module comprises a liquid crystal display panel and a backlight module. The backlight module comprises light-emitting diode (LED) light bars. The light rays emitted by the LED light bars can be incident to the liquid crystal display panel. The liquid crystal display panel modulates the light rays by liquid crystal deflection to realize image display.

SUMMARY

The present disclosure provides a backlight module, a display module and control method thereof, and a storage medium. The technical solutions are as follows.

In a first aspect, there is provided a backlight module, comprising m backlight components, wherein m is larger than or equal to 2 and is an integer, the at backlight components are capable of emitting light alternately, and the light rays emitted by any two of the m backlight components do not overlap.

Optionally, the backlight module further comprises a retaining wall structure disposed between every two adjacent backlight components, wherein the retaining wall structure is configured to shield the light rays, such that the light rays emitted by any two of the m backlight components do not overlap.

Optionally, the backlight module further comprises an adhesive frame and a back plate, wherein the adhesive frame is disposed on the periphery of the back plate, the retaining wall structure is arranged on the back plate, the adhesive frame and the retaining wall structure define m backlight areas on the back plate, and one of the m backlight components is arranged in each of the in backlight areas.

Optionally, the backlight module further comprises a main flexible printed circuit board and m secondary flexible printed circuit boards corresponding to the mu backlight components respectively, wherein first secondary flexible printed circuit board and second secondary flexible printed circuit board(s) are respectively connected to the main flexible printed circuit board, the main flexible printed circuit board and the first secondary flexible printed circuit board are respectively disposed on one surface of the back plate away from the retaining wall structure, end(s) of the second secondary flexible printed circuit board(s) away from the main flexible printed circuit board is disposed on one surface of the back plate away from the retaining wall structure, and end(s) of the second secondary flexible printed circuit hoard(s) close to the main flexible printed circuit board is not connected to the back plate; and wherein the first secondary flexible printed circuit board is the secondary flexible printed circuit board closest to the main flexible printed circuit board in the in secondary flexible printed circuit boards, and the second secondary flexible printed circuit board(s) is the secondary flexible printed circuit boards other than the first secondary flexible printed circuit board in the m secondary flexible printed circuit boards.

Optionally, the first secondary flexible printed circuit hoard is connected to the main flexible primed circuit board by welding; the second secondary flexible printed circuit board(s) is connected to the main flexible printed circuit board by welding, or the second secondary flexible printed circuit board(s) is connected to the main flexible printed circuit board by a connector; the main flexible printed circuit board and the first secondary flexible printed circuit board are respectively adhered to one surface of the back plate away from the retaining wall structure; and end(s) of the second secondary flexible printed circuit board(s) close to the main flexile printed circuit board is shaped or L-shaped, and in the end(s) of the second secondary flexible printed circuit board(s) close to the main flexible primed circuit board, the parts close to the main flexible printed circuit board are not connected to the back plate, and the parts away from the main flexible printed circuit board are adhered to one surface of the back plate away from the retaining wall structure.

Optionally, each backlight component of the m backlight components comprises a light bar, a light guide plate, a diffusion sheet, a prism sheet and a reflector plate, in each backlight component:

the diffusion sheet and the prism sheet are disposed on a light-emitting surface of the light guide plate in sequence, the reflector plate is disposed on the side of one surface on the light guide plate opposite to the light-emitting surface, the light bar is disposed on the secondary flexible printed circuit board corresponding to each backlight component, the light bar is located on the side surface of the light guide plate, or the light bar is located between the light guide plate and the reflector plate.

Optionally, each backlight component of the m backlight components further comprises a diffusion sheet adhesive tape, and the diffusion sheet adhesive tape is adhered to the edge of the diffusion sheet close to the light bar.

Optionally, the backlight module further comprises an iron frame, a light-shielding adhesive tape and a washer, wherein the iron frame is disposed on the outer side of the adhesive frame, the light-shielding adhesive tape is disposed on the prism sheet, an orthogonal projection of the light-shielding adhesive tape on the light guide plate is located in the peripheral region of the light guide plate close to the adhesive frame, and the washer is disposed on the light-shielding adhesive tape.

Optionally, the iron frame and the back plate are of an integral structure.

Optionally, the retaining wall structure and the adhesive frame are of an integral structure.

Optionally, the connector is a zero-insertion force connector.

Optionally, m is equal to 2.

In a second aspect, there is provided a display module, comprising a display panel and a backlight module, wherein the display panel has m display areas, the backlight module comprises m backlight components corresponding to the m display areas respectively, m is equal to or larger than 2 and is an integer.

the m backlight components are capable of emitting light alternately, the light rays emitted by a first backlight component are capable of being incident to a first display area, the light rays are not incident to the display areas other than the first display area, the first backlight component is any one of the m backlight components, and the first display area is the display area in the in display areas corresponding to the first backlight component.

Optionally, an orthogonal projection of each of the m display areas on the backlight module is located in the corresponding backlight component; or an orthogonal projection of each of the m display areas on the backlight module overlaps with the corresponding backlight component.

Optionally, the display panel is a liquid crystal display panel.

Optionally, m is equal to 2.

In a third aspect, there is provided a control method for a display module, wherein the display module comprises a display panel and a backlight module, wherein the display panel has in display areas, the backlight module comprises in backlight components corresponding to the in display areas respectively, in is equal to or larger than 2 and is an integer, and the control method comprises:

controlling the m backlight components to emit light alternately; wherein the light rays emitted by a first backlight component are capable of being incident to a first display area, the light rays are not incident to the display areas other than the first display area, the first backlight component is any one of the m backlight components, and the first display area is the display area in the in display areas corresponding to the first backlight component.

Optionally, each of the m backlight components comprises a light bar, and controlling the m backlight components to emit light alternately comprises:

determining target display areas with deflected liquid crystal molecules in the in display areas; and controlling the light bars of the backlight components corresponding to the target display areas to be turned off, and controlling the light bars of the backlight components corresponding to the display areas, other than the target display areas, in the in display areas to be turned on.

Optionally, each of the in backlight components corresponds to one driving circuit, and controlling the m backlight components to emit light alternately comprises: driving the m backlight components to emit light alternately the m driving circuits corresponding to the m backlight components.

In a fourth aspect, there is provided a readable storage medium, wherein an instruction is stored in the readable storage medium, and when the instruction operates on a processing component, the processing component executes the control method for a display module in the third aspect or in any one the optional implementations in the third aspect.

In a fifth aspect, there is provided a program product comprising instructions, when program product operates on a processing component, the processing component executes the control method for a display module in the third aspect or in any one the optional implementations in the third aspect.

It is understandable, that both the foregoing general description and the following detailed description are exemplary only, and are not intended to limit the present disclosure.

DETAILED DESCRIPTION

The present disclosure will be described in further detail with reference to the drawings, to clearly present the principle and advantages of the present disclosure. Apparently, the embodiments described are merely some embodiments of the present disclosure but all embodiments. Based on the embodiments in the present disclosure, any other embodiments derived by a person of ordinary skill in the art shall fall within the scope of protection of the present disclosure.

In the close-range AR&VR display device, in order to prevent a user from dazing due to the liquid crystal deflection, a black frame insertion technology is usually adopted (a full black frame is inserted between two adjacent frames or a plurality of frames, or LED light bars are controlled to blink) to control the backlight module. The black frame insertion technology requires that the LED light bars have a very high instantaneous brightness. In the related art, the instantaneous brightness of the LED light bars is mainly increased by increasing the operating current of the LED light bars. However, if the operating current of the LED light bars is increased, the LED light bars will generate higher heat. As a result, the light-emitting stability of the LED light bars is lower, and thus the working stability of the backlight module is lower. The backlight module provided in the embodiment of the present disclosure adopts m backlight components to alternately emit light to achieve close-range AR&VR display. Under the condition of not increasing the operating current, the backlight module has higher brightness and the working stability of the backlight module can be improved. The solutions provided by the embodiments of the present disclosure refer to the following embodiments.

Figure 1:
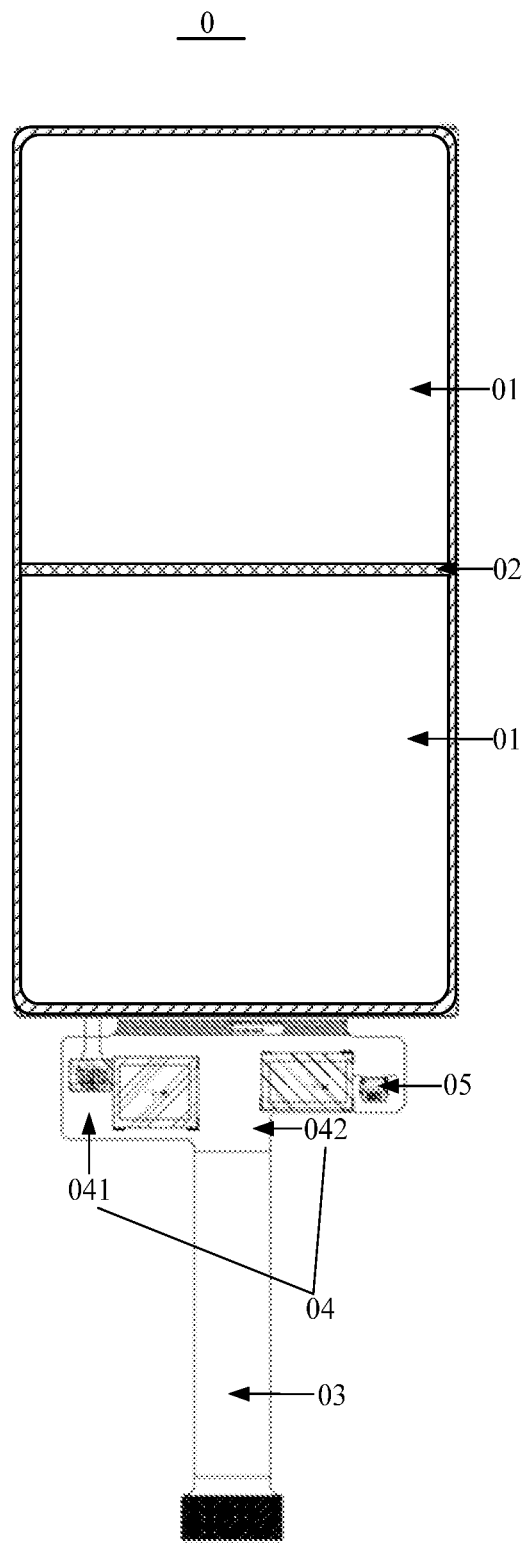
FIG. 1 is a front view of a backlight module according to an embodiment of the present disclosure.
Figure 2:
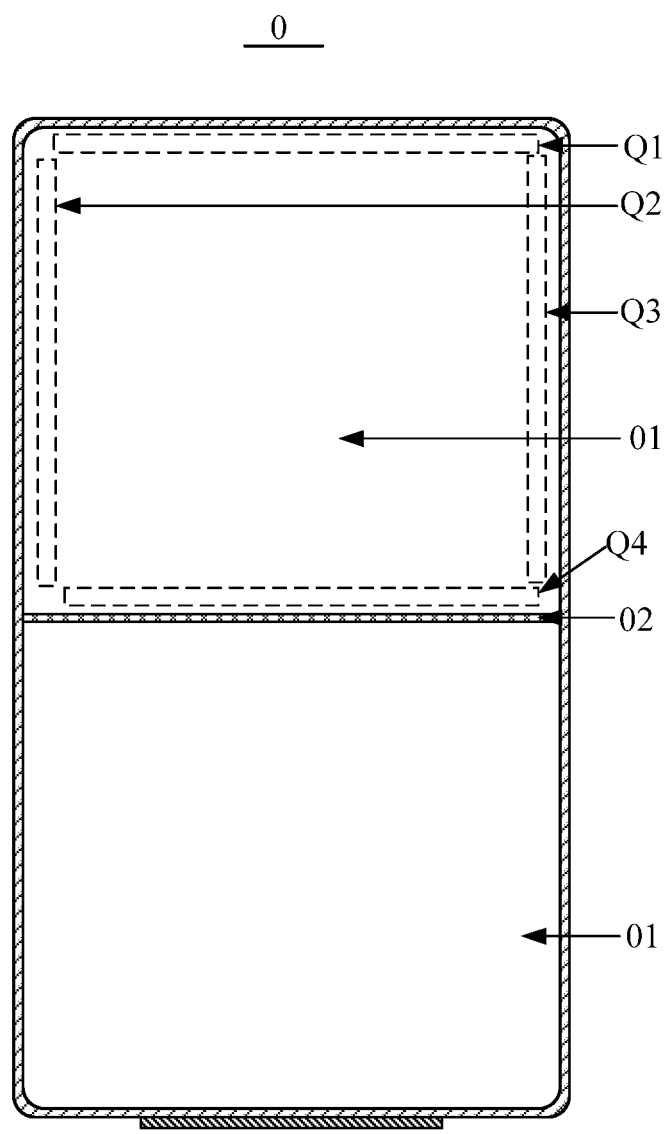
FIG. 2 is a front view of another backlight module according to an embodiment of the present disclosure.

FIG. 1 shows a front view of a backlight module 0 provided by an embodiment of the present disclosure. Referring to FIG. 1, the backlight module 0 comprises: m backlight components 01. m is larger than or equal to 2, and is an integer. The m backlight components 01 may alternately emit light. The light rays emitted from any two of the m backlight components 01 do not overlap. Exemplarily, as shown in FIG. 2, the embodiment of the present disclosure takes m=2 as an example for illustration. Then the backlight module 0 comprises two backlight components 01. In practical application, m may also take other values, for example, m=3, m=4, or m=5, etc. The value of m is not limited by the embodiment of the present disclosure.

Optionally, continuing to refer to FIG. 1, the backlight module 0 further comprises: a retaining wall structure 02 disposed between every two adjacent backlight components 01. The retaining wall structure 02 is configured to shield the light rays, so that the light rays emitted from any two of the m backlight components 01 do not overlap. The retaining wall structure 02 can be made of an opaque material and can absorb and/or reflect the light rays incident to the retaining wall structure 02, so that the retaining wall structure 02 can achieve the shielding of the light.

Optionally, the backlight module 0 further comprises an adhesive frame (not shown in FIG. 1) and a back plate (not shown in FIG. 1). The adhesive frame is disposed on the periphery of the back plate. The retaining wall structure 02 is disposed on the back plate. The adhesive frame and the retaining wall structure 02 define m backlight areas (not shown in FIG. 1) on the back plate. A backlight component 01 is disposed in each backlight area. In the embodiment of the present disclosure, the retaining wall structure 02 and the adhesive frame are of an integral structure. Or the retaining wall structure 02 and the adhesive frame are of detachable structures, that is, the retaining wall structure 02 and the plastic frame are independent structures respectively, but are detachably connected, which is not limited by the embodiment of the present disclosure.

Optionally, continuing to refer to FIG. 1, the backlight module 0 further comprises a main flexible printed circuit (FPC) board 03 and m secondary flexible printed circuit boards 04 corresponding to the m backlight components 01 respectively. In the embodiment of the present disclosure, m is equal to 2. At this point, the backlight module 0 comprises two secondary flexible printed circuit boards 04. As shown in FIG. 1, the two secondary flexible printed circuit boards 04 may comprise a first secondary flexible printed circuit board 041 and a second secondary flexible printed circuit board 042. The first secondary flexible printed circuit board 041 and the second secondary flexible printed circuit board 042 are respectively connected to the main flexible printed circuit board 03. Optionally, the first secondary flexible printed circuit board 041 is connected to the main flexible printed circuit board 03 by welding. The second secondary flexible printed circuit board 042 is connected to the main flexible printed circuit board 03 by welding, or is connected to the main flexible printed circuit board by a connector 05. The connector 05 may be a zero insertion force (ZIF) connector. The connector 05 may be disposed on the main flexible printed circuit board 03, and the connector 05 is provided with a socket. The second secondary flexible printed circuit board 042 may have a connecting end. The connecting end of the second secondary flexible printed circuit board 042 may be inserted into the socket of the connector 05, such that the second secondary flexible printed circuit board 042 and the main flexible printed circuit board 03 are connected by the connector 05.

Figure 3:
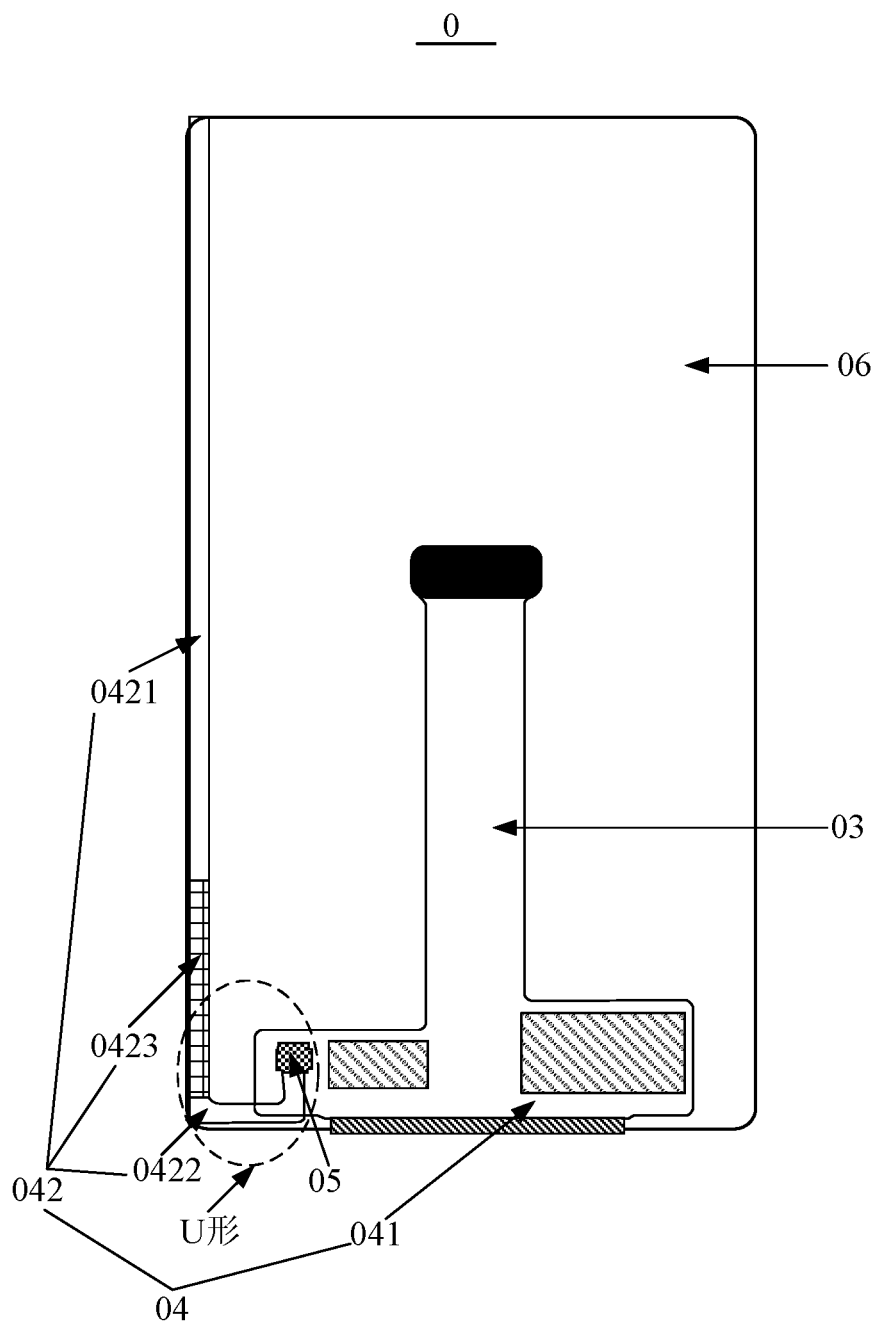
FIG. 3 is a rear view of a backlight module according to an embodiment of the present disclosure.

In the finished product of the backlight module, the main flexible printed circuit board 03 and the m secondary flexible printed circuit boards 04 as shown in FIG. 1 are all disposed on the back plate of the backlight module 0. Optionally, FIG. 2 and FIG. 3 respectively show a front view and a rear view of the backlight module 0 provided by the embodiment of the present disclosure (FIG. 2 is the front view of the backlight module 0, and FIG. 3 is the rear view of the backlight module 0). Referring to FIG. 1 to FIG. 3, in the finished product of the backlight module 0 (as shown in FIG. 2 and FIG. 3), the main flexible printed circuit board 03 and the first secondary flexible printed circuit board 041 are respectively disposed on one surface of the back plate 06 away from the retaining wall structure 02. One end 0421 of the second secondary flexible printed circuit board 042 away from the main flexible printed circuit board 03 is disposed on one surface of the back plate 06 away from the retaining wall structure 02. One end of the second secondary flexible printed circuit board 042 close to the main flexible printed circuit board 03 is not connected to the back plate 06. The first secondary flexible printed circuit board 041 is the secondary flexible printed circuit board closest to the main flexible printed circuit board 03 in the m secondary flexible printed circuit boards 04. The second secondary flexible printed circuit board 042 is the secondary flexible printed circuit board other than the first secondary flexible printed circuit board 041 in the m secondary flexible printed circuit boards 04. Optionally, the main flexible printed circuit board 03 and the first secondary flexible printed circuit board 041 are respectively adhered to one surface of the back plate 06 away from the retaining wall structure 02. One end of the second secondary flexible printed circuit board 042 close to the main flexible printed circuit board 03 is U-shape or L-shape. In the one end of the second secondary flexible printed circuit board 042 close to the main flexible printed circuit board 03, the part 0422 close to the main flexible printed circuit board 03 is not connected to the back plate 06, and the part 0423 away from the main flexible printed circuit board 03 is adhered to one surface of the back plate 06 away from the retaining wall structure 02.

Figure 4:
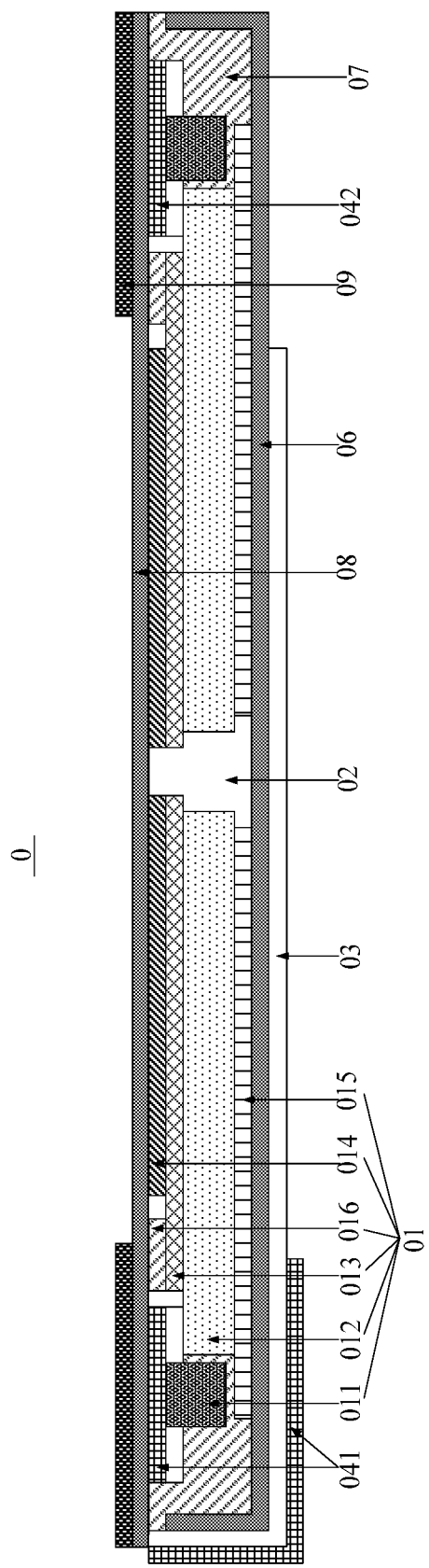
FIG. 4 is a cross-sectional view of a backlight module according to an embodiment of the present disclosure.

FIG. 4 shows a sectional view of the backlight module 0 shown in FIG. 2. Referring to FIG. 4, each of the m backlight components 01 comprises a light bar 011, a light guide plate 012, a diffusion sheet 013, a prism sheet 014, and a reflector plate 015. In each backlight component 01, the diffusion sheet 013 and the prism sheet 014 are sequentially disposed on a light-emitting surface (not shown in FIG. 4) of the light guide plate 012. The reflective plate 015 is disposed on the side of one surface of the light guide plate 012 opposite to the light-emitting surface of the light guide plate 012. The light bar 011 is disposed on the secondary flexible printed circuit board corresponding to each backlight component 01, and the light bar 011 is located on the side surface of the light guide plate 012. Or, the light bar 011 is located between the light guide plate 012 and the reflective plate 015. Herein, the light bar 011 is configured to provide a light source. When the light bar 011 is located on the side surface of the light guide plate 012, the light bar 011 may be called as a side-lit light source. When the light bar 011 is located between the light guide plate 012 and the reflective plate 015, the light bar 011 may be called as a direct-lit light source. In the embodiment of the present disclosure, the light bar 011 is located on the side surface of the light guide plate 012. The light bar 011 may be an LED light bar. The light bar 011 may comprise a plurality of LED lights. The light rays emitted by the LED lights sequentially pass through the light guide plate 012, the diffusion sheet 013 and the prism sheet 014 and are emergent from the backlight module 0. The light guide plate 012 is configured to transmit the light rays. The diffusion sheet 013 may adjust the light rays-emitting from the light-emitting surface of the light guide plate 012 to diverge the light rays, so that the light rays passing through the diffusion sheet 013 are more uniform to form a uniform surface light source. The quality of the light rays is improved. The prism sheet 014 is generally formed by stacking an upper prism sheet (not shown in FIG. 4) and a lower prism sheet (not shown in FIG. 4). The upper prism sheet and the lower prism sheet are sequentially deviated from the diffusion sheet 013. The prism sheet (the upper prism sheet or lower prism sheet) may comprise a layer of transparent plastic film and a layer of prism structure uniformly and orderly covering the plastic film. The prism structure can improve the angle of the light rays and will converge the light rays-emitting from the diffusion sheet 013 and diverged toward various angles in an axial direction (perpendicular to the diffusion sheet), thereby increasing the brightness in the axial direction without increasing the total luminous flux. The reflective plate 015 may reflect the light rays incident toward the reflective plate 015, such that more light rays can be emergent from the backlight module 0 by the light guide plate 012, the diffusion sheet 013, and the prism sheet 014, and the brightness of the backlight module 0 is increased. In the embodiment of the present disclosure, as shown in FIG. 4, each backlight component 01 further comprises a diffusion sheet adhesive tape 016. The diffusion sheet adhesive tape 016 may be attached to the edge of the diffusion sheet 013 close to the light bar 011. The diffusion sheet adhesive tape 016 is a black adhesive tape. The diffusion sheet adhesive tape 016 mainly plays a role of absorbing part of the light rays emergent in front of the lights to avoid light leakage of the backlight module 0, thereby optimizing the pre-light taste of the backlight module 0. The structures of the light bar 011, the light guide plate 012, the diffusion sheet 013, the prism sheet 014, the reflective plate 015, and the diffusion sheet adhesive tape 016 may all refer to the related art, and are not be repeated by the present embodiment of the disclosure. It should be noted that in practical application, in each backlight component 01, the light bar 011 may be located on any of the four side surfaces of the light guide plate 012. For example, as shown in FIG. 2, the light bar of the backlight component 01 may be located in any of the area Q1, the area Q2, the area Q3, and the area Q4. FIG. 4 shows a schematic diagram that the light bar is located in the area Q1.

Optionally, as shown in FIG. 4, the backlight module 0 further comprises an iron frame (not shown in FIG. 4), a light-shielding adhesive tape 08, and a washer 09. The iron frame is disposed on the outer side of the adhesive frame 07. The iron frame and the back plate 06 may be of an integral structure. Or, the iron frame and the back plate 06 may be detachable structures. That is, the iron frame and the back plate 06 are two independent structures respectively, but are detachably connected. The light-shielding adhesive tape 08 is disposed on the prism sheet 014. The orthogonal projection of the light-shielding adhesive tape 08 on the light guide plate 012 is located in the peripheral area of the light guide plate 012 close to the adhesive frame 07. The light-shielding adhesive tape 08 may be clip-shaped. The light-shielding adhesive tape 08 is configured to shield the light rays to prevent the backlight module 0 from light leakage. The washer 09 may be disposed on the light-shielding adhesive tape 08. The washer 09 may be heightened foam. The washer 09 is configured to buffer the display panel when the backlight module 0 is assembled with the display panel (not shown in FIG. 4), to protect the display panel.

It should be noted that in the embodiment of the present disclosure, when the backlight module 0 is assembled, the first secondary flexible printed circuit board 041 may be welded on the main flexible printed circuit board 03 after the backlight components 01 are assembled (the schematic diagram that the first secondary flexible printed circuit board 041 is welded on the main flexible printed circuit board 03 is shown in FIG. 1). Then the whole formed by welding the first secondary flexible printed circuit board 041 and the main flexible printed circuit board 03 is bent to one side of the back plate of the backlight module 0 away from the retaining wall structure 02. The first secondary flexible printed circuit board 041 and the main flexible printed circuit board 03 are adhered to one surface of the back plate 06 away from the retaining wall structure 02 (as shown in FIG. 3). Afterwards, one end 0421 of the second secondary flexible printed circuit board 042 away from the main flexible printed circuit board 03 is adhered to on one surface of the back plate 06 away from the retaining wall structure 02. One end of the second secondary flexible printed circuit board 042 close to the main flexible printed circuit board 03 is kept not connected to the back plate 06. Then the connecting end of the second secondary flexible printed circuit board 042 is inserted into the socket of the connector 05 on the main flexible printed circuit board 03, so that the second secondary flexible printed circuit board 042 is connected to the main flexible printed circuit board 03 by the connector 05. Then the part 0423 away from the connector 05 in one end of the second secondary flexible printed circuit board 042 close to the main flexible printed circuit board 03 is adhered to the back plate 06, and the part 0422 close to the connector 05 in one end of the second secondary flexible printed circuit board 042 close to the main flexible printed circuit board 03 is not connected to the back plate 06. In the embodiment of the present disclosure, one end of the second secondary flexible printed circuit board 042 close to the main flexible printed circuit board 03 is U-shape or L-shape, and the second secondary flexible printed circuit board 042 is connected to the main flexible printed circuit board 03 by the connector 05. Therefore, the problem that the second secondary flexible printed circuit board 042 is tightly bent in welding and assembling is avoided. The use stability of the flexible printed circuit board is improved. During the reliability test of the backlight module, the second secondary flexible printed circuit board 042 will be deformed together with the main flexible circuit 03. The second secondary flexible printed circuit board 042 has no problem of stress concentration, so that wrinkles are not generated, and the problems of reliability separation and the like are not generated. In the embodiment of the present disclosure, when the backlight module 0 is assembled, because part of the area of the second secondary flexible printed circuit board 042 and the back plate 06 are not attached at first, a relatively large free space is given to the joint of the second secondary flexible printed circuit board 042. The assembling efficiency and the yield are improved. When the backlight module 0 is assembled, the first secondary flexible printed circuit board 041 and the main flexible printed circuit board 03 are adhered to the back plate 06 at first, thereby ensuring the transportation stability of the backlight module 0 and avoiding that the second secondary flexible printed circuit board 042 is bent when being assembled. Part of the area of the second secondary flexible printed circuit board 042 is not adhered to the back plate 06 at first. The connector 05 is adopted to connect the second secondary flexible printed circuit board 042 to the main flexible printed circuit board 03. Then part of the area of the second secondary flexible printed circuit board 042 is attached to the back plate 06. The relatively large free space is given to the joint of the second secondary flexible printed circuit board 042. The assembling accuracy and operability are improved.

It should be noted that the brightness of the AR&VR backlight module in the related art is low, and the stability of the LED light bar working at high power is low. For the backlight module provided by the embodiment of the present disclosure, the m backlight components can alternately emit light and the light rays emitted from any two backlight components do not overlap. Therefore, the m backlight components can be controlled to alternately emit light. The backlight module has higher brightness without increasing the operating current. The problem of lower working stability of the backlight module in the related art is solved. The working stability of the backlight module is favorably improved.

The backlight module provided by the embodiment of the present disclosure can be used for an AR&VR product. The backlight module can solve the problem caused since the close-range AR&VR product needs to adopt the black frame insertion technology, as well as the problem of low brightness and low stability of the traditional display modules. The brightness and stability of the backlight module can be improved. The backlight module provided by the embodiment of the present disclosure has a broad market application prospect.

Figure 5:
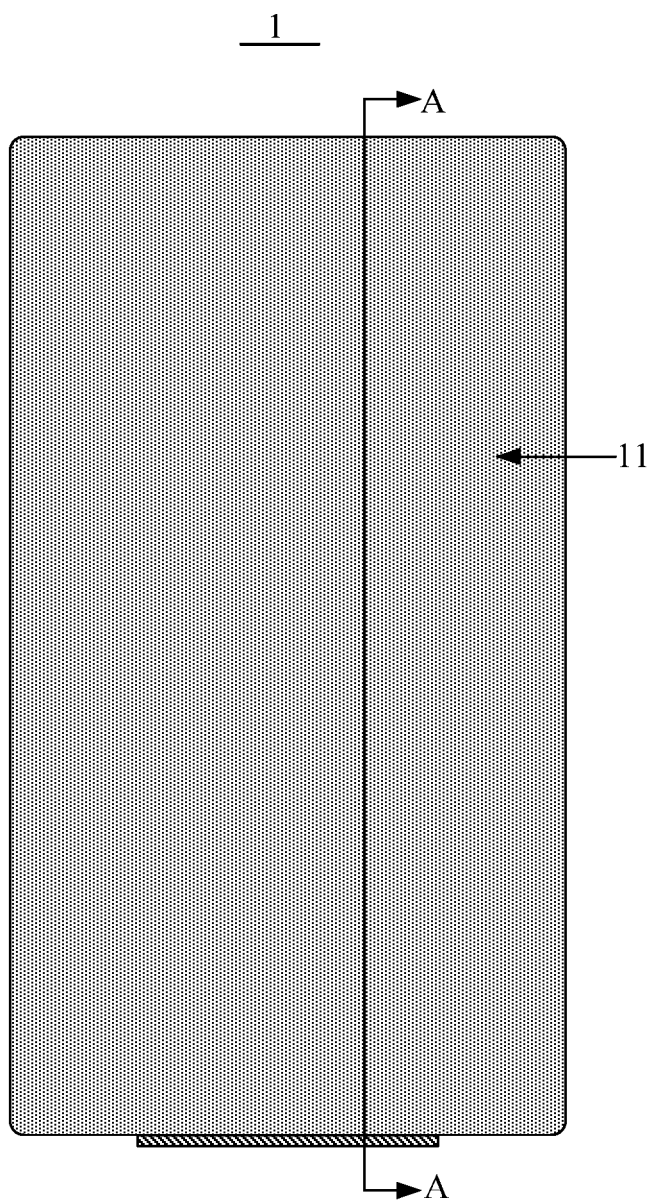
FIG. 5 is a front view of a backlight module according to an embodiment of the present disclosure.
Figure 6:
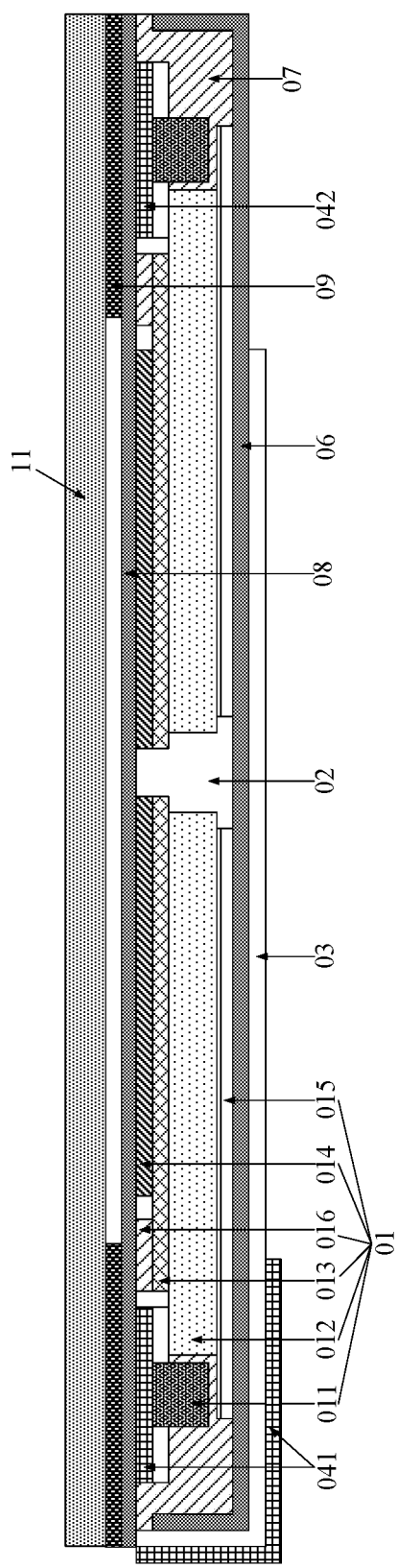
FIG. 6 is a cross-sectional view of a backlight module according to an embodiment of the present disclosure.

FIG. 5 shows a front view of a display module 1 provided by an embodiment of the present disclosure. FIG. 6 is a sectional view of the A-A portion of the display module 1 as shown in FIG. 5. Referring to FIG. 5 and FIG. 6, the display module 1 comprises a display panel 11 and a backlight module. The backlight module may be the backlight module as shown in any one of FIG. 1 to FIG. 4. The display panel has m display areas (not shown in FIG. 5 and FIG. 6). The backlight module comprises m backlight components 01 corresponding to the m display areas respectively. m is larger than or equal to 2 and is an integer. In the embodiment of the present disclosure, m is equal to 2. At this point, as shown in FIG. 6, the backlight module comprises two backlight components 01. Optionally, an orthogonal projection of each of them display areas on the backlight module is located in the corresponding backlight component 01, or the orthogonal projection of each of the m display areas on the backlight module overlaps with the corresponding backlight component 01.

In the embodiment of the present disclosure, the m backlight components of the backlight module can alternately emit light. The light rays emitted by a first backlight component (not shown in FIG. 5 and FIG. 6) can be incident to a first display area (not shown in FIG. 5 and FIG. 6). The light rays emitted by the first backlight component are not incident to the display areas other than the first display area. The first backlight component is any one of the m backlight components 01. The first display area is the display area in the m display areas corresponding to the first backlight component. Herein, the orthogonal projection of the first display area on the backlight module is located in the first backlight component, or the orthogonal projection of the first display area on the backlight module overlaps with the first backlight component. It should be noted that in the AR&VR display module, the image displayed in part of display areas of the display panel is non-effective. Therefore, in the embodiment of the present disclosure, the orthogonal projection of the retaining wall structure of the backlight module on the display panel may be located in such part of display areas. Hence, the disposed retaining wall structure will not affect the display of the display panel either.

It should be noted that in the embodiment of the present disclosure, the display panel 11 may be a liquid crystal display panel. The display panel 11 generally comprises an array substrate, a color film substrate, liquid crystal disposed between the array substrate and the color film substrate, an upper polarizer located on one side of the array substrate away from the liquid crystal, and a lower polarizer located on one side of the color film substrate away from the liquid crystal. The display panel 11 may further comprise a driving circuit and a flexible printed circuit board for setting the driving circuit. The flexible printed circuit board of the display panel 11 may be connected to the main flexible printed circuit board 03 of the backlight module. Or the flexible printed circuit board of the display panel 11 and the main flexible printed circuit board 03 of the backlight module are of an integral structure. The structure of the liquid crystal display panel may refer to the related art. The structure of the backlight module described in FIG. 5 and FIG. 6 may refer to FIG. 1 to FIG. 4, and is not repeated in detail in the present embodiment of the disclosure.

In summary, according to the display module provided by the embodiment of the present disclosure, the m backlight components of the backlight module can alternately emit light and the light rays emitted from any two backlight components do not overlap. Therefore, the m backlight components can be controlled to alternately emit light. Without increasing the operating current, the backlight module has relatively high brightness. The problem that the backlight module has lower working stability in the related art is solved. The working stability of the backlight module is favorably improved.

The display module provided by the embodiment of the present disclosure can be applied to the control method for a display module in the following. The control method and a control principle for a display module in the embodiment of the present disclosure may refer to the description in respective embodiments in the following.

The embodiment of the present disclosure provides a control method for a display module. The control method for a display module may be applied to control the display module 1 as shown in FIG. 5 or FIG. 6. The control method for a display module comprises the following step.

M backlight components are controlled emit light alternately.

Herein, the light rays emitted by a first backlight component can be incident to a first display area. The light rays emitted by the first backlight component are not incident to the display areas other than the first display area. The first backlight component is any one of the m backlight components. The first display area is the display area in the m display areas corresponding to the first backlight component.

In the embodiment of the present disclosure, each of the m backlight components may correspond to one driving circuit. The driving circuit corresponding to each backlight component may be disposed on the corresponding secondary flexible printed circuit board. The driving circuit may drive the corresponding backlight component to emit light or not. All the driving circuits corresponding to the backlight components may be connected to a driving chip. The driving chip may be disposed on the main flexible printed circuit board. The driving chip may control the corresponding backlight component to emit light or not by each driving circuit, thereby controlling the m backlight components to alternately emit light. In the embodiment of the present disclosure, the display panel has m display areas. The backlight module comprises m backlight components corresponding to the m display areas of the display panel respectively. The retaining wall structure is disposed between every two adjacent backlight components, and the retaining wall structure can shield the light rays. Therefore, the light rays emitted by each backlight component can be incident to the display area corresponding to the backlight component and cannot be incident to the display areas corresponding to other backlight components.

It should be noted that in the embodiment of the present disclosure, in order to avoid the influence of the alternated light emitting of the m backlight components on the display of the display panel, the light-emitting period that the m backlight components alternately emit light may be less than the reaction time of human eyes. In this way, for the user, the picture displayed by the display panel when the m backlight components alternately emit light is the same as the picture displayed by the display panel when the m backlight components emit light at the same time. The visual experience of the user is not affected.

Figure 7:
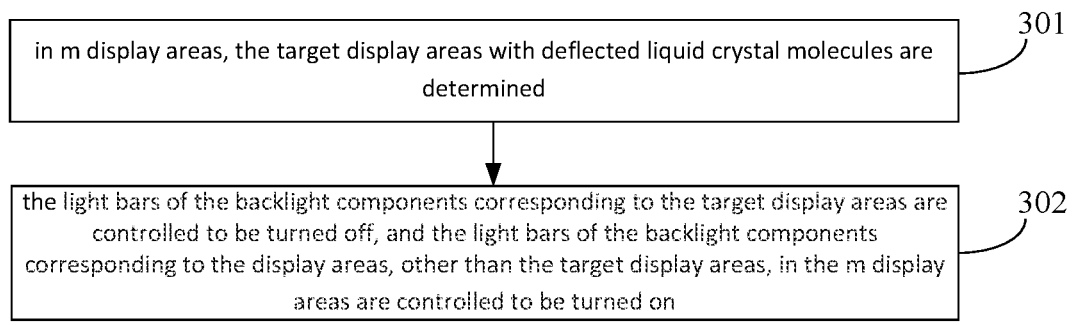
FIG. 7 is a flowchart of method for controlling in backlight components to emit light alternately according to an embodiment of the present disclosure.

Optionally, referring to FIG. 7, which shows a flow chart of a method for controlling m backlight components to alternately emit light provided by the embodiment of the present disclosure, the method comprises the following steps.

In step 301, in m display areas, the target display areas with deflected liquid crystal molecules are determined.

Herein, the liquid crystal display panel realizes the image display by driving the liquid crystal molecules to deflect. The liquid crystal molecules are deflected row by row, so that the liquid crystal display panel displays row by row. In the embodiment of the present disclosure, the driving chip may be a driving chip of the display panel. That is, the driving circuit corresponding to each backlight component may be connected to the driving chip of the display panel. The driving chip of the display panel can determine the target display areas with the deflected liquid crystal molecules in the m display areas of the display panel. Optionally, the driving chip of the display panel drives the liquid crystal molecules to deflect by applying voltages to the display panel. The driving chip of the display panel can determine the target display areas with the deflected liquid crystal molecules by the voltages applied to different display areas of the display panel.

In step 302, the light bars of the backlight components corresponding to the target display areas are controlled to be turned off, and the light bars of the backlight components corresponding to the display areas, other than the target display areas, in the m display areas are controlled to be turned on.

After the driving chip of the display panel determines the target display areas, the backlight components corresponding to the target display areas can be determined. The backlight components corresponding to the target display areas may be called as target backlight components. The driving chip of the display panel may drive the light bars of the target backlight components to be turned off by the driving circuits of the target backlight components, and control the light bars of other backlight components to be turned on.

Optionally, the driving chip of the display panel can apply different voltage signals to different backlight components by the driving circuits of different backlight components, to cause the light bars of the backlight components to be turned on or off. For example, the driving chip of the display panel applies a first voltage to the target backlight components by the driving circuits of the target backlight components. Under the action of the first voltage, the light bars of the target backlight components are turned off. Meanwhile, the driving chip of the display panel applies a second voltage to other backlight components by the driving circuits of the other backlight components. Under the action of the second voltage, the light bars of the other backlight components are turned on.

The above steps 301 to 302 are specific to one light-emitting period. In other words, in the process of controlling them backlight components to alternately emit light, the driving chip of the display panel adopts the method of the step 301 to the step 302 to control the backlight components to emit light in each light-emitting period, which is not repeated in detail in the present embodiment of the disclosure.

It should be noted that in the close-range AR&VR display module, in order to prevent a user from dazing due to liquid crystal deflection, the display module is usually controlled by a black frame insertion technology. The black frame insertion technology requires the LED light bars to have a very high instantaneous brightness. In the related art, the instantaneous brightness of the LED light bars is mainly increased by increasing the operating current of the LED light bars. However, in this way, the LED light bars are caused to generate higher heat, which affects the function of fluorescent powder of the LED light bars, and causes the problem of large current and bluing to the LED light bars (the principle of LED is to use a blue light chip to emit blue light, and to convert the blue light to white light by the action of the fluorescent powder, the LED is caused to eventually emit the white light, the higher heat will affect the work of the fluorescent powder, and as a result, the LED emits the blue light). It is assumed that the time that the display panel displays one frame image (that is, the liquid crystal molecules of all rows of the display panel are deflected once) is $T0$. In the related art, when the black frame insertion processing is needed, the light bars of the backlight module do not emit light during the period of the black frame insertion processing. While in the embodiment of the present disclosure, the light rays emitted by the m backlight components do not affect each other. Therefore, the backlight components corresponding to the target display areas with the deflected liquid crystal molecules can be controlled to emit light. Hence, the turning off duration of the display module can be $T0/m$. The brightness perceived by the human eyes can be increased by m times. For example, when m is equal to 2, and when the liquid crystal molecules of the first display area of the display panel are deflected row by row, the backlight component corresponding to the first display area can be controlled to be turned off, while the backlight component corresponding to the second display area is not turned off. When the liquid crystal molecules in the second display area of the display panel are deflected row by row, the backlight component corresponding to the second display area can be controlled to be turned off, while the backlight component corresponding to the first display area is not turned off. The turning off duration of the display module can be $T0/2$. The brightness perceived by the human eyes will be doubled. The first display area and the second display area are different display areas in the two display areas of the display panel.

In summary, according to the method for controlling the display module provided by the embodiment of the present disclosure, the m backlight components of the backlight module can alternately emit light and the light rays emitted from any two backlight components do not overlap. Therefore, the m backlight components can be controlled to alternately emit light. Without increasing the operating current, the backlight module has relatively high brightness. The problem that the backlight module has lower working stability in the related art is solved. The working stability of the backlight module is favorably improved.

The embodiments of the present disclosure further provide a readable storage medium, wherein instructions are stored in the readable storage medium, and when the instruction operates on a processing component, the processing component executes the control method for a display module described above.

The embodiments of the present disclosure further provide a program product comprising instructions, when program product operates on a processing component, the processing component executes the control method for a display module described above.

The term "and/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

Persons of ordinary skill in the art may understand that all or part of the steps described in the above embodiments can be completed through hardware, or through relevant hardware instructed by application stored in a computer readable storage medium, such as read-only memory, magnetic disk or CD, etc.

The foregoing are only exemplary embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A backlight module, comprising m backlight components and a retaining wall structure disposed between every two adjacent backlight components, wherein m is larger than or equal to 2 and is an integer, the m backlight components are capable of emitting light alternately, and the retaining wall structure is configured to shield light rays, such that areas illuminated by light rays emitted by any two of the m backlight components do not overlap;
   the backlight module further comprises a back plate, a main flexible printed circuit board and m secondary flexible printed circuit boards corresponding to the m backlight components respectively;
   the retaining wall structure is arranged on the back plate;
   first secondary flexible printed circuit board and second secondary flexible printed circuit board(s) are respectively connected to the main flexible printed circuit board, the main flexible printed circuit board and the first secondary flexible printed circuit board are respectively disposed on one surface of the back plate away from the retaining wall structure, end(s) of the second secondary flexible printed circuit board(s) away from the main flexible printed circuit board is disposed on one surface of the back plate away from the retaining wall structure, and end(s) of the second secondary flexible printed circuit board(s) close to the main flexible printed circuit board is not connected to the back plate; and
   the first secondary flexible printed circuit board is the secondary flexible printed circuit board closest to the main flexible printed circuit board in the m secondary flexible printed circuit boards, and the second secondary flexible printed circuit board(s) is the secondary flexible printed circuit board(s) other than the first secondary flexible printed circuit board in the m secondary flexible printed circuit boards.

2. The backlight module according to claim 1, further comprising an adhesive frame, wherein
   the adhesive frame is disposed on periphery of the back plate, the adhesive frame and the retaining wall structure define m backlight areas on the back plate, and one of the m backlight components is arranged in each of the m backlight areas.

3. The backlight module according to claim 2, wherein each backlight component of the m backlight components comprises a light bar, a light guide plate, a diffusion sheet, a prism sheet and a reflector plate,
   in each backlight component:
   the diffusion sheet and the prism sheet are disposed on a light-emitting surface of the light guide plate in sequence, the reflector plate is disposed on the side of one surface on the light guide plate opposite to the light-emitting surface, the light bar is disposed on the secondary flexible printed circuit board corresponding to each backlight component, the light bar is located on the side surface of the light guide plate.

4. The backlight module according to claim 3, wherein each backlight component of the m backlight components further comprises a diffusion sheet adhesive tape, and the diffusion sheet adhesive tape is adhered to the edge of the diffusion sheet close to the light bar.

5. The backlight module according to claim 3, further comprising an iron frame, a light-shielding adhesive tape and a washer, wherein
   the iron frame is disposed on the outer side of the adhesive frame, the light-shielding adhesive tape is disposed on the prism sheet, an orthogonal projection of the light-shielding adhesive tape on the light guide plate is located in the peripheral region of the light guide plate close to the adhesive frame, and the washer is disposed on the light-shielding adhesive tape.

6. The backlight module according to claim 5, wherein the iron frame and the back plate are of an integral structure.

7. The backlight module according to claim 2, wherein the retaining wall structure and the adhesive frame are of an integral structure.

8. The backlight module according to claim 1, wherein
   the first secondary flexible printed circuit board is connected to the main flexible printed circuit board by welding;
   the second secondary flexible printed circuit board(s) is connected to the main flexible printed circuit board by one of two connecting modes of welding connection and connector connection;
   the main flexible printed circuit board and the first secondary flexible printed circuit board are respectively adhered to one surface of the back plate away from the retaining wall structure; and
   end(s) of the second secondary flexible printed circuit board(s) close to the main flexible printed circuit board is one of U-shape and L-shape, and in the end(s) of the second secondary flexible printed circuit board(s) close to the main flexible printed circuit board, the parts close to the main flexible printed circuit board are not connected to the back plate, and the parts away from the main flexible printed circuit board are adhered to one surface of the back plate away from the retaining wall structure.

9. The backlight module according to claim 5, wherein the connector is a zero-insertion force connector.

10. The backlight module according to claim 1, wherein m is equal to 2.

11. A display module, comprising a display panel and a backlight module, wherein the display panel has m display areas, the backlight module comprises m backlight components corresponding to the m display areas respectively and a retaining wall structure disposed between every two adjacent backlight components, m is equal to or larger than 2 and is an integer, the m backlight components are capable of emitting light alternately, the retaining wall structure is configured to shield light rays, such that areas illuminated by light rays emitted by any two of the m backlight components do not overlap, and such that the light rays emitted by a first backlight component are capable of being incident to a first display area, the light rays are not incident to the display areas other than the first display area, the first backlight component is any one of the m backlight components, and the first display area is the display area in the m display areas corresponding to the first backlight component;

the display panel is a liquid crystal display panel, liquid crystal molecules in the display panel are configured to deflect row by row to realize a row-by-row image display, and each of the m display areas comprises at least one row of the liquid crystal molecules, wherein in the m display areas, display areas with deflected liquid crystal molecules correspond to backlight components that are turned off, and the remaining display areas correspond to backlight components that are turned on.

12. The display module according to claim 11, wherein an orthogonal projection of each of the m display areas on the backlight module is located within the corresponding backlight component.

13. The display module according to claim 11, wherein an orthogonal projection of each of the m display areas on the backlight module overlaps with the corresponding backlight component.

14. The display module according to claim 11, wherein the backlight module further comprises an adhesive frame and a back plate, wherein the adhesive frame is disposed on periphery of the back plate, the retaining wall structure is arranged on the back plate, the adhesive frame and the retaining wall structure define m backlight areas on the back plate, and one of the m backlight components is arranged in each of the m backlight areas.

15. The display module according to claim 14, wherein the backlight module further comprises a main flexible printed circuit board and m secondary flexible printed circuit boards corresponding to the m backlight components respectively, wherein first secondary flexible printed circuit board and second secondary flexible printed circuit board(s) are respectively connected to the main flexible printed circuit board, the main flexible printed circuit board and the first secondary flexible printed circuit board are respectively disposed on one surface of the back plate away from the retaining wall structure, end(s) of the second secondary flexible printed circuit board(s) away from the main flexible printed circuit board is disposed on one surface of the back plate away from the retaining wall structure, and end(s) of the second secondary flexible printed circuit board(s) close to the main flexible printed circuit board is not connected to the back plate; and wherein the first secondary flexible printed circuit board is the secondary flexible printed circuit board closest to the main flexible printed circuit board in the m secondary flexible printed circuit boards, and the second secondary flexible printed circuit board(s) is the secondary flexible printed circuit board(s) other than the first secondary flexible printed circuit board in the m secondary flexible printed circuit boards.

16. The display module according to claim 11, wherein the backlight module further comprises a back plate, a main flexible printed circuit board and m secondary flexible printed circuit boards corresponding to the m backlight components respectively;

the retaining wall structure is arranged on the back plate;

first secondary flexible printed circuit board and second secondary flexible printed circuit board(s) are respectively connected to the main flexible printed circuit board, the main flexible printed circuit board and the first secondary flexible printed circuit board are respectively disposed on one surface of the back plate away from the retaining wall structure, end(s) of the second secondary flexible printed circuit board(s) away from the main flexible printed circuit board is disposed on one surface of the back plate away from the retaining wall structure, and end(s) of the second secondary flexible printed circuit board(s) close to the main flexible printed circuit board is not connected to the back plate; and the first secondary flexible printed circuit board is the secondary flexible printed circuit board closest to the main flexible printed circuit board in the m secondary flexible printed circuit boards, and the second secondary flexible printed circuit board(s) is the secondary flexible printed circuit board(s) other than the first secondary flexible printed circuit board in the m secondary flexible printed circuit boards.

17. A control method for a display module, wherein the display module comprises a display panel and a backlight module, wherein the display panel has m display areas, the backlight module comprises m backlight components corresponding to the m display areas respectively and a retaining wall structure disposed between every two adjacent backlight components, where m is equal to or larger than 2 and is an integer, and the control method comprises:

controlling the m backlight components to emit light alternately;

wherein the retaining wall structure is configured to shield light rays, such that areas illuminated by light rays emitted by any two of the m backlight components do not overlap, and such that the light rays emitted by a first backlight component are capable of being incident to a first display area, the light rays are not incident to the display areas other than the first display area, the first backlight component is any one of the m backlight components, and the first display area is the display area in the m display areas corresponding to the first backlight component;

the backlight module further comprises a back plate, a main flexible printed circuit board and m secondary flexible printed circuit boards corresponding to the m backlight components respectively;

the retaining wall structure is arranged on the back plate;

first secondary flexible printed circuit board and second secondary flexible printed circuit board(s) are respectively connected to the main flexible printed circuit board, the main flexible printed circuit board and the first secondary flexible printed circuit board are respectively disposed on one surface of the back plate away from the retaining wall structure, end(s) of the second secondary flexible printed circuit board(s) away from the main flexible printed circuit board is disposed on one surface of the back plate away from the retaining wall structure, and end(s) of the second secondary flexible printed circuit board(s) close to the main flexible printed circuit board is not connected to the back plate; and the first secondary flexible printed circuit board is the secondary flexible printed circuit board closest to the main flexible printed circuit board in the m secondary flexible printed circuit boards, and the second secondary flexible printed circuit board(s) is the secondary flexible printed circuit board(s) other than the first secondary flexible printed circuit board in the m secondary flexible printed circuit boards.

18. The control method according to claim 17, wherein each of the m backlight components comprises a light bar, and controlling the m backlight components to emit light alternately comprises:

determining target display areas with deflected liquid crystal molecules in the m display areas; and controlling the light bars of the backlight components corresponding to the target display areas to be turned off, and controlling the light bars of the backlight components corresponding to the display areas, other than the target display areas, in the m display areas to be turned on.

19. The control method according to claim 17, wherein each of the m backlight components corresponds to one driving circuit, and controlling the m backlight components to emit light alternately comprises:

driving the m backlight components to emit light alternately by m driving circuits corresponding to the m backlight components.

20. A readable storage medium in which instructions are stored, when the instructions operating on a processing component, the processing component executing the control method for a display module according to claim 17.

* * * * *